US012082578B2

United States Patent
Ui et al.

(10) Patent No.: US 12,082,578 B2
(45) Date of Patent: Sep. 10, 2024

(54) HERBICIDE COMPOSITION

(71) Applicant: KAO CORPORATION, Tokyo (JP)

(72) Inventors: Takahito Ui, Wakayama (JP); Katsuhiko Yamaguchi, Wakayama (JP)

(73) Assignee: KAO CORPORATION, Tokyo (JP)

(*) Notice: Subject to any disclaimer, the term of this patent is extended or adjusted under 35 U.S.C. 154(b) by 781 days.

(21) Appl. No.: 17/253,368

(22) PCT Filed: Jun. 25, 2019

(86) PCT No.: PCT/JP2019/025047
§ 371 (c)(1),
(2) Date: Dec. 17, 2020

(87) PCT Pub. No.: WO2020/008940
PCT Pub. Date: Jan. 9, 2020

(65) Prior Publication Data
US 2021/0100241 A1   Apr. 8, 2021

(30) Foreign Application Priority Data

Jul. 5, 2018  (JP) .................................. 2018-128289
May 10, 2019  (JP) .................................. 2019-089712

(51) Int. Cl.
*A01N 25/30* (2006.01)
*A01N 57/20* (2006.01)
*A01P 13/00* (2006.01)

(52) U.S. Cl.
CPC ............. *A01N 25/30* (2013.01); *A01N 57/20* (2013.01); *A01P 13/00* (2021.08)

(58) Field of Classification Search
None
See application file for complete search history.

(56) References Cited

U.S. PATENT DOCUMENTS

| 5,863,863 A * | 1/1999 | Hasebe ................. A01N 59/20 504/362 |
| 5,912,209 A | 6/1999 | Kassebaum et al. |
| 2002/0123430 A1 | 9/2002 | Xu et al. |
| 2009/0286684 A1 | 11/2009 | Scherl et al. |
| 2011/0177945 A1 | 7/2011 | Klingelhoefer et al. |
| 2013/0196854 A1 | 8/2013 | Kamei et al. |

FOREIGN PATENT DOCUMENTS

| EP | 1343375 A2 | 9/2003 |
| JP | 9-506615 A | 6/1997 |
| JP | 11-292717 A | 10/1999 |
| JP | 2002-542267 A | 12/2002 |
| JP | 2003-535056 A | 11/2003 |
| JP | 2013-517249 A | 5/2013 |
| JP | 2013-522265 A | 6/2013 |
| JP | 2014-125445 A | 7/2014 |
| KR | 1999-0078243 A | 10/1999 |
| WO | WO-87/04595 A1 | 8/1987 |
| WO | WO 00/64258 A1 | 11/2000 |
| WO | WO-2007017217 A1 | 2/2007 |
| WO | WO 2011/113786 A2 | 9/2011 |
| WO | WO 2012/029893 A1 | 3/2012 |

OTHER PUBLICATIONS

Partial human translation of JP 2014-125445 (2014), paragraphs 42 and 45.*
Extended European Search Report issued Mar. 16, 2022 in Patent Application No. 19830533.6.
International Search Report, issued in PCT/JP2019/025047, PCT/ISA/210, dated Sep. 24, 2019.
English translation of the International Preliminary Report on Patentability and Written Opinion issued Jan. 14, 2021 in PCT/JP2019/025047, 8 pages.

* cited by examiner

*Primary Examiner* — John Pak
(74) *Attorney, Agent, or Firm* — Element IP, PLC

(57) ABSTRACT

A herbicide composition excellent in herbicidal effect and a weeding method using the herbicide composition, and a herbicidal efficacy enhancing agent composition capable of increasing the herbicidal effect are provided. A herbicide composition containing the following components (A) to (C), wherein a mass ratio of the content of component (B) to the content of component (C), (B)/(C), is 0.25 or more and 0.6 or less:
component (A): an agrochemical active ingredient of an amino acid-based herbicide;
component (B): a particular polyoxyalkylene alkyl or alkenyl amine or an acid salt thereof; and
component (C): a particular polyoxyalkylene alkyl or alkenyl ether.

11 Claims, No Drawings

HERBICIDE COMPOSITION

FIELD OF THE INVENTION

The present invention relates to a herbicide composition, a weeding method and a herbicidal efficacy enhancing agent composition.

BACKGROUND OF THE INVENTION

Conventionally, in order to fully exploit effects of agrochemicals, various kinds of surfactants have been utilized for agrochemical-containing compositions. While, in such an amino acid-based agrochemical as a glyphosate salt which is one of the active ingredients most often used as a herbicide, nonionic surfactants or anionic surfactants commonly employed for other agrochemicals are difficult to apply because of their low compatibility with amino acid-based agrochemicals, quaternized or polyoxyethylenized long-chain amines have been known to be effective for that purpose. Especially, polyoxyethylenized tallow amines have been widely utilized in such an amino acid-based agrochemical as a glyphosate salt for their excellent cost performance. Recently, however, there have been concerns about environmental effects of polyoxyethylenized tallow amines due to their very low biodegradability, strong ichthyotoxicity and the like, and alternatives have been desired.

JP-A 2003-535056 discloses a formulation useful in retarding the growth of vegetation, including an aqueous mixture containing a surfactant and glyphosate or a salt or ester thereof, wherein the nature of said surfactant and the composition of said formulation are such that, when said formulation is applied to a plant, a liquid crystal including said surfactant is formed on the foliage leaves of the plant.

JP-A H11-292717 discloses a herbicide composition including: (A) a certain 3-aryl uracil; (B) glyphosate; (C) a combination of at least one of polyoxyalkylene alkylamine-based nonionic surfactants and at least one of nonionic surfactants other than polyoxyalkylene alkylamine-based surfactants; and (D) water.

JP-A 2014-125445 discloses an agrochemical composition containing the followings under certain conditions: (A) one or more compounds selected from particular ethoxylate-type compounds, particular polyoxyethylene fatty acid esters, particular polyoxyethylene sorbitan fatty acid esters, particular (poly)glycerin fatty acid esters and particular alkyl saccharides; (B) a particular alkoxylate compound or aliphatic alcohol including a propyleneoxy group; (C) a particular amine-type surfactant; (D) a particular agrochemical active ingredient; and water.

SUMMARY OF THE INVENTION

However, sufficient herbicidal effect has not been obtained by those prior arts.

The present invention provides a herbicide composition excellent in herbicidal effect and a weeding method using the herbicide composition, and a herbicidal efficacy enhancing agent composition capable of increasing the herbicidal effect.

The present invention relates to a herbicide composition containing the following components (A) to (C), wherein a mass ratio of the content of component (B) to the content of component (C), (B)/(C), is 0.25 or more and 0.6 or less:

component (A): an agrochemical active ingredient of an amino acid-based herbicide;

component (B): a compound represented by the following general formula (b1) or an acid salt thereof:

(b1)

wherein $R^{1b}$ is a hydrocarbon group with 8 or more and 14 or less carbons, and $A^{1b}O$ is an alkyleneoxy group with 2 or more and 4 or less carbons; each of m and n is independently an average number of added moles of $A^{1b}O$, which is a number of 0 or more, and the sum of m and n is a number of 0 or more and 50 or less; and each of $R^{2b}$ and $R^{3b}$ is independently a hydrogen atom or a methyl group; and component (C): a compound represented by the following general formula (c1):

$$R^{1c}-O-(A^{1c}O)_s-H \qquad (c1)$$

wherein $R^{1c}$ is a hydrocarbon group with 10 or more and 22 or less carbons, and $A^{1c}O$ is an alkyleneoxy group with 2 or more and 4 or less carbons; and s is an average number of added moles of $A^{1c}O$, which is a number of 2 or more and 50 or less.

In addition, the present invention relates to a weeding method including spraying a herbicidal spray liquid prepared from the herbicide composition to plants.

In addition, the present invention relates to a herbicidal efficacy enhancing agent composition containing the aforementioned components (B) and (C), wherein a mass ratio of the content of component (B) to the content of component (C), (B)/(C), is 0.25 or more and 0.6 or less.

According to the present invention, a herbicide composition excellent in herbicidal effect and a weeding method using the herbicide composition, and a herbicidal efficacy enhancing agent composition capable of increasing the herbicidal effect are provided.

EMBODIMENTS OF THE INVENTION

[Herbicide Composition]

A reason why the herbicide composition of the present invention is excellent in herbicidal effect is not wholly known, but is inferred as follows: it is inferred that the combined use of compounds (B) and (C) at the predetermined ratio can change a structure of a plant cuticle, thereby achieving migration of compound (A) to both the inside of the leaves and the root, so that high herbicidal effect can be exhibited.

<Component (A)>

Component (A) of the present invention is an agrochemical active ingredient of an amino acid-based herbicide.

While examples of the agrochemical active ingredient (active component) of an amino acid-based herbicide are not particularly limited as long as they are agrochemical active ingredients having a structure derived from an amino acid such as glycine, alanine or the like, specific examples thereof include glyphosate [N-(phosphonomethyl)glycine or a salt thereof], bialaphos [a sodium salt of L-2-amino-4-[(hydroxy) (methyl)=phosphinoyl]butyryl-L-alanyl-L-alanine] and glufosinate [ammonium-DL-homoalanine-4-yl (methyl)phosphinate], and glyphosate or glufosinate is preferable and glyphosate is more preferable from the viewpoint of increasing the herbicidal effect and the viewpoint of excellent formulation stability of the herbicide composition. They may be agriculturally acceptable salts. In addition, at the time of formulating the herbicide composition with them, they can also be used as an aqueous solution, a liquid agent, a wettable powder or the like containing them.

<Component (B)>

Component (B) of the present invention is a compound represented by the following general formula (b1) or an acid salt thereof:

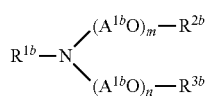
(b1)

wherein $R^{1b}$ is a hydrocarbon group with 8 or more and 14 or less carbons, and $A^{1b}O$ is an alkyleneoxy group with 2 or more and 4 or less carbons; each of m and n is independently an average number of added moles of $A^{1b}O$, which is a number of 0 or more, and the sum of m and n is a number of 0 or more and 50 or less; and each of $R^{2b}$ and $R^{3b}$ is independently a hydrogen atom or a methyl group.

$R^{1b}$ is a hydrocarbon group, preferably an alkyl group or an alkenyl group, more preferably an alkyl group and further preferably a linear alkyl group from the viewpoint of increasing the herbicidal effect. $R^{1b}$ has 8 or more, preferably 10 or more and more preferably 12 or more, and 14 or less carbons from the viewpoint of increasing the herbicidal effect.

From the viewpoint of increasing the herbicidal effect, $A^{1b}O$ is an alkyleneoxy group with 2 or more, and 4 or less and preferably 3 or less carbons, and more preferably an ethyleneoxy group.

The sum of m and n is a number of preferably 1 or more, more preferably 3 or more and further preferably 5 or more from the viewpoint of increasing the herbicidal effect, and a number of preferably 20 or less, more preferably 15 or less and further preferably 10 or less from the viewpoints of the increase in the herbicidal effect, the formulation stability, and the productivity. The sum of m and n is preferably 5 or less and more preferably 2 or less, and 0 or more, and may also be 0 from the viewpoints of further formulation stability and productivity.

$R^{2b}$ and $R^{3b}$ are preferably hydrogen atoms when the sum of m and n is more than 0, and preferably methyl groups when the sum of m and n is 0.

The compound of the general formula (b1) may be present in the form of an acid salt in the herbicidal composition, and examples of the acid salt include hydrochloride, sulfate, nitrate and the like.

As component (B), a component in which $R^{2b}$ and $R^{3b}$ are hydrogen atoms and the sum of m and n is more than 0 (hereinafter, also referred to as component $(B_A)$) is preferable from the viewpoint of further increasing the herbicidal effect, and a component in which $R^{2b}$ and $R^{3b}$ are methyl groups and the sum of m and n is 0 (hereinafter, also referred to as component $(B_B)$) is preferable from the viewpoints of further formulation stability and productivity. From the viewpoint of further enhancing the increase in the herbicidal effect and the formulation stability, components $(B_A)$ and $(B_B)$ can be used together as component (B).

<Component (C)>

Component (C) of the present invention is a compound represented by the following general formula (c1):

(c1)

wherein $R^{1c}$ is a hydrocarbon group with 10 or more and 22 or less carbons, and $A^{1c}O$ is an alkyleneoxy group with 2 or more and 4 or less carbons; and s is an average number of added moles of $A^{1c}O$, which is a number of 2 or more and 50 or less.

$R^{1c}$ is a hydrocarbon group, preferably a linear hydrocarbon group and more preferably a linear alkyl group or alkenyl group from the viewpoint of increasing the herbicidal effect. $R^{1c}$ has 10 or more and preferably 12 or more carbons from the viewpoints of increasing the herbicidal effect and suppressing the regrowth of weeds and the like, and 22 or less, preferably 20 or less and more preferably 18 or less carbons from the viewpoints of the formulation stability and the productivity.

When $R^{1c}$ is an alkyl group, $R^{1c}$ has 10 or more and preferably 12 or more carbons from the viewpoints of increasing the herbicidal effect and suppressing the regrowth of weeds and the like, and preferably 14 or less and more preferably 12 carbons from the viewpoints of the formulation stability and the productivity. When $R^{1c}$ is an alkenyl group, $R^{1c}$ has preferably 16 or more, and 22 or less, preferably 18 or less and more preferably 18 carbons from the viewpoint of increasing the herbicidal effect and the viewpoint of the formulation stability.

From the viewpoint of increasing the herbicidal effect, $A^{1c}O$ is an alkyleneoxy group with 2 or more, and 4 or less and preferably 3 or less carbons, and more preferably an ethyleneoxy group.

From the viewpoint of increasing the herbicidal effect, a proportion of an ethyleneoxy group in $A^{1c}O$ is preferably 50 mass % or more, more preferably 70 mass % or more and further preferably 90 mass % or more, and preferably 100 mass % or less, and may also be 100 mass %.

s is a number of preferably 2 or more, more preferably 6 or more and further preferably 9 or more from the viewpoint of increasing the herbicidal effect, and a number of preferably 30 or less, more preferably 24 or less, further preferably 20 or less, furthermore preferably 15 or less and furthermore preferably 10 or less from the viewpoints of the increase in the herbicidal effect, the formulation stability, and the productivity.

From the viewpoint of enhancing the herbicidal effect, in all component (c), a proportion of a compound in which $A^{1c}O$ in the general formula (c1) is an alkyleneoxy group with 3 or 4 carbons is preferably 50 mass % or less, more preferably 40 mass % or less, further preferably 20 mass % or less and furthermore preferably 10 mass % or less, and may also be 0 mass %.

From the viewpoints of the formulation stability and the productivity, the herbicide composition of the present invention preferably contains as component (C) a compound represented by the following general formula (c2) (hereinafter, referred to as component $(C_A)$) and a compound represented by the following general formula (c3) (hereinafter, referred to as component $(C_B)$):

(c2)

wherein $R^{2c}$ is a hydrocarbon group with 10 or more and 22 or less carbons, and EO is an ethyleneoxy group; and r is an average number of added moles of EO, which is a number of 2 or more and 50 or less; and

(c3)

wherein $R^{3c}$ is a hydrocarbon group with 10 or more and 22 or less carbons, EO is an ethyleneoxy group, and PO is a propyleneoxy group; p and q are average numbers of added moles of EO and PO, respectively, p is a number of 0 or more, q is a number of more than 0, and the sum of p and q is a number of 2 or more and 50 or less; and when p is more than 0, "/" indicates that the arrangements of EO and PO may be block or random.

As to component ($C_A$), preferable modes of $R^{2c}$ and r are similar respectively to those of $R^{1c}$ and s of the general formula (c1) in the aforementioned component (C).

As to component ($C_B$), a preferable mode of $R^{1c}$ is similar to that of $R^{1c}$ of the general formula (c1) in the aforementioned component (C).

p is a number of 0 or more, preferably 2 or more, more preferably 4 or more and further preferably 6 or more from the viewpoint of enhancing the herbicidal effect, and a number of preferably 20 or less, more preferably 15 or less and further preferably 10 or less from the viewpoint of the formulation stability.

q is a number of more than 0, preferably 0.5 or more, more preferably 1 or more and further preferably 1.5 or more from the viewpoint of the formulation stability, and a number of preferably 10 or less, more preferably 7 or less, further preferably 5 or less and furthermore preferably 3 or less from the viewpoint of enhancing the herbicidal effect.

The sum of p and q is a number of 2 or more, preferably 3 or more and more preferably 6 or more, and a number of 50 or less, preferably 30 or less, more preferably 25 or less, further preferably 20 or less and furthermore preferably 10 or less from the viewpoints of the formulation stability and the productivity.

A ratio of q to the sum of p and q, [q/(p+q)], is preferably 0.01 or more and more preferably 0.1 or more from the viewpoints of the formulation stability and the productivity, and preferably 0.5 or less and more preferably 0.3 or less from the viewpoint of increasing the herbicidal effect.

The arrangements of PO and EO are preferably a block arrangement and more preferably a block arrangement in the order of $EO_{p1}$, $PO_q$ and $EO_{p2}$ to $R^{1c}$—O— from the viewpoints of the formulation stability and the productivity. Here, each of p1 and p2 is an average number of added moles of EO, and the sum of p1 and p2 is p and the preferable range is also the same as that of p.

<Composition and Others>

The herbicide composition of the present invention contains component (A) in an amount of preferably 20 mass % or more, more preferably 30 mass % or more and further preferably 40 mass % or more from the viewpoint of increasing the herbicidal effect, and preferably 70 mass % or less, more preferably 60 mass % or less and further preferably 50 mass % or less from the viewpoint of the formulation stability.

The herbicide composition of the present invention contains component (B) in an amount of preferably 0.5 mass % or more, more preferably 1.0 mass % or more and further preferably 2.0 mass % or more from the viewpoint of increasing the herbicidal effect, and preferably 20 mass % or less, more preferably 15 mass % or less, further preferably 10 mass % or less and furthermore preferably 5.0 mass % or less from the viewpoints of the formulation stability and the economic efficiency.

Note that, in the present invention, descriptions regarding mass of component (B) (mass % or a mass ratio) are calculated on the basis of amounts in terms of the amine which is not an acid salt, i.e., a non-neutralized amine.

The herbicide composition of the present invention contains component (C) in an amount of preferably 1.0 mass % or more, more preferably 3.0 mass % or more and further preferably 5.0 mass % or more from the viewpoint of increasing the herbicidal effect, and preferably 20 mass % or less, more preferably 15 mass % or less and further preferably 10 mass % or less from the viewpoints of the increase in the herbicidal effect and the formulation stability.

In the herbicide composition of the present invention, a mass ratio of the content of component (B) to the content of component (C), (B)/(C), is 0.25 or more, preferably 0.30 or more and more preferably 0.35 or more from the viewpoint of increasing the herbicidal effect, and 0.60 or less, preferably 0.55 or less, more preferably 0.50 or less, further preferably 0.45 or less and furthermore preferably 0.40 or less from the viewpoint of increasing the herbicidal effect.

When the herbicide composition of the present invention contains components ($C_A$) and ($C_B$) as component (C), a proportion of the total contents of components ($C_A$) and ($C_B$) to the content of component (C), [($C_A$)+($C_B$)]/(C), is preferably 80 mass % or more, more preferably 85 mass % or more and further preferably 90 mass % or more, and preferably 100 mass % or less, and may also be 100 mass %, from the viewpoint of increasing the herbicidal effect.

When the herbicide composition of the present invention contains components ($C_A$) and ($C_B$) as component (C), a mass ratio of the content of component ($C_A$) to the content of component ($C_B$), ($C_A$)/($C_B$), is preferably 0.1 or more, more preferably 0.5 or more and further preferably 1 or more, and preferably 9 or less, more preferably 6 or less, further preferably 4 or less and furthermore preferably 2 or less, from the viewpoints of the formulation stability and the productivity.

In the herbicide composition of the present invention, the total content of components (B) and (C) is preferably 1.0 mass % or more, more preferably 2.0 mass % or more, further preferably 3.0 mass % or more, furthermore preferably 4.0 mass % or more and furthermore preferably 5.0 mass % or more from the viewpoint of increasing the herbicidal effect, and preferably 20 mass % or less, more preferably 15 mass % or less and further preferably 10 mass % or less from the viewpoints of the increase in the herbicidal effect and the formulation stability.

In the herbicide composition of the present invention, a mass ratio of the total contents of components (B) and (C) to the content of component (A), [(B)+(C)]/(A), is preferably 0.04 or more, more preferably 0.06 or more, further preferably 0.08 or more and furthermore preferably 0.09 or more from the viewpoint of increasing the herbicidal effect, and preferably 1.4 or less, more preferably 1.2 or less, further preferably 1.0 or less and furthermore preferably 0.5 or less from the viewpoints of the increase in the herbicidal effect and the formulation stability.

From the viewpoints of the formulation stability and the productivity, the herbicide composition of the present invention preferably further contains a compound represented by the following general formula (d1) as component (D):

wherein $R^{1d}$ is a hydrocarbon group with 8 or more and 18 or less carbons, each of $R^{2d}$ and $R^{3d}$ is independently a methyl group, an ethyl group, a hydroxyethyl group or a hydroxypropyl group, and Rod is a methyl group, an ethyl group or a benzyl group; and $X^-$ is an anion.

$R^{1d}$ is a hydrocarbon group, preferably a linear or branched alkyl group or alkenyl group and more preferably a linear alkyl group from the viewpoints of the formulation stability and the productivity. $R^{1d}$ has 8 or more, preferably 10 or more and more preferably 12 or more, and 18 or less and preferably 14 or less carbons.

Each of $R^{2d}$ and $R^{3d}$ is independently preferably a methyl group or a hydroxyethyl group and more preferably a methyl group from the viewpoints of the formulation stability and the productivity.

$R^{4d}$ is preferably a methyl group from the viewpoints of the formulation stability and the productivity, and preferably a benzyl group from the viewpoint of increasing the herbicidal effect.

$X^-$ is preferably a chloride ion, a bromide ion, a methyl sulfuric acid ion or an ethyl sulfuric acid ion and more preferably a chloride ion from the viewpoints of the formulation stability and the productivity.

The herbicide composition of the present invention contains component (D) in an amount of preferably 0.1 mass % or more, more preferably 0.2 mass % or more and further preferably 0.4 mass % or more from the viewpoints of the formulation stability and the productivity, and preferably 20 mass % or less, more preferably 15 mass % or less, further preferably 10 mass % or less, furthermore preferably 5 mass % or less, furthermore preferably 3 mass % or less and furthermore preferably 1 mass % or less from the viewpoint of the economic efficiency.

In the herbicide composition of the present invention, a mass ratio of the content of component (C) to the content of component (D), (C)/(D), is preferably 1 or more, more preferably 2 or more, further preferably 3 or more and furthermore preferably 4 or more from the viewpoint of the economic efficiency, and preferably 10 or less, more preferably 8 or less and further preferably 6 or less from the viewpoints of the formulation stability and the productivity.

From the viewpoint of the formulation stability, the herbicide composition of the present invention is preferably a liquid composition and more preferably a liquid composition containing water. The herbicide composition of the present invention contains water in an amount of preferably 10 mass % or more, more preferably 20 mass % or more and further preferably 30 mass % or more from the viewpoint of the formulation stability, and preferably 80 mass % or less, more preferably 70 mass % or less and further preferably 60 mass % or less from the viewpoint of the economic efficiency.

As water, unless the effects of the herbicide composition of the present invention are impaired, tap water, distilled water, deionized water and the like can be used, and deionized water is preferable from the viewpoint of the stability.

The herbicide composition of the present invention can optionally contain compounds other than components (A) to (D) and water, for example, a chelating agent, a pH adjuster, inorganic salts, a defoamer, a thickener and the like.

The present invention provides use, as a herbicide, of a composition containing components (A), (B) and (C), wherein a mass ratio of the content of component (B) to the content of component (C), (B)/(C), is 0.25 or more and 0.6 or less. The aspects mentioned in the herbicide composition of the present invention can be appropriately applied to the use as a herbicide of the present invention. In the use as a herbicide of the present invention, components (A), (B) and (C) and optional components, and their preferable modes are the same as those mentioned in the herbicide composition of the present invention.

[Weeding Method]

A weeding method of the present invention is a weeding method including spraying a herbicidal spray liquid prepared from the herbicide composition of the present invention to plants. The aforementioned herbicidal spray liquid is preferably prepared by adding water to the herbicide composition of the present invention.

In the weeding method of the present invention, the aspects mentioned in the herbicide composition of the present invention can be appropriately applied.

In the weeding method of the present invention, the herbicide composition of the present invention is used by diluting with water such that the total content of components (A), (B) and (C) in the herbicidal spray liquid is preferably 1,000 ppm or more, more preferably 1,500 ppm or more and further preferably 2,000 ppm or more from the viewpoint of enhancing the herbicidal effect, and preferably 10,000 ppm or less, more preferably 8,000 ppm or less and further preferably 6,000 ppm or less from the viewpoint of the economic efficiency.

In the weeding method of the present invention, the herbicidal spray liquid is sprayed at a proportion of preferably 0.5 L/ha or more, more preferably 50 L/ha or more, further preferably 200 L/ha or more and furthermore preferably 500 L/ha or more from the viewpoint of obtaining the efficacy of the agrochemical, and preferably 2000 L/ha or less, more preferably 1500 L/ha or less, further preferably 1200 L/ha or less and furthermore preferably 1000 L/ha or less from the viewpoint of the economic efficiency and the viewpoint of reduction in environmental burden.

The weeding method of the present invention includes applying a predetermined spray liquid to plants to be eradicated, or weeds. In the agricultural field, weeds are recognized as herbaceous plants which grow in a farmland or its vicinity and do harm to crop production. In addition, in fields other than agriculture, they are recognized as herbaceous plants which naturally grow, for example, not only in a farmland but also in a non-farmland such as a road, a railroad, a bank, a plant site, a developed land, a grass site, a garden or the like and impair functions of such lands or cause problems in disaster prevention or landscapes. In the present invention, any of these herbaceous plants is included as weeds. Examples of weeds include broadleaf weeds, gramineous weeds and the like. Broadleaf weeds have leaves with net-like veins unlike weeds having linear leaves such as gramineous weeds or weeds having leaves with parallel veins.

Examples of weeds to which the weeding method of the present invention is directed include gramineous weeds. Examples of the gramineous weeds include *Echinochloa crus-galli, Setaria viridis, Setaria pumila, Setaria viridis* f. *misera, Poa annua, Alopecurus aequalis, Eragrostis multicaulis* stead., *Digitaria violascens* Link., *Digitaria ciliaris, Eragrostis ferruginea, Dactylis glomerata* (orchard grass), *Miscanthus sinensis, Paspalum thunbergii* Kunth ex Steud., *Imperata cylindrica* (L.) *P. Beauv., Pennisetum alopecuroides, Phragmites australis* and bamboo grass, and *Echinochloa crus-galli* is preferable from the viewpoint of the efficacy of the agrochemical.

The weeding method of the present invention can be directed to a weed selected from broadleaf weeds and the gramineous weeds. Further, the weeding method of the present invention can be directed to *Echinochloa crus-galli*.

[Herbicidal Efficacy Enhancing Agent Composition]

The herbicidal efficacy enhancing agent composition of the present invention is a herbicidal efficacy enhancing agent composition containing components (B) and (C), wherein a mass ratio of the content of component (B) to the content of component (C), (B)/(C), is 0.25 or more and 0.6 or less.

Component (A) is excluded from the components with which the herbicidal efficacy enhancing agent composition of the present invention is formulated. In addition, the aforementioned herbicidal efficacy enhancing agent composition not containing component (A) is also included in the herbicidal efficacy enhancing agent composition of the present invention.

The herbicidal efficacy enhancing agent composition of the present invention is suitable for use in a herbicide containing an agrochemical active ingredient of an amino acid-based herbicide (component (A)), preferably glyphosate or glufosinate and more preferably glyphosate.

The herbicide composition of the present invention can be prepared by formulating the herbicidal efficacy enhancing agent composition of the present invention with component (A). That is, a method for producing the herbicide composition of the present invention can be a producing method including mixing the aforementioned herbicidal efficacy enhancing agent composition and component (A).

The aspects mentioned in the herbicide composition and the weeding method of the present invention can be appropriately applied to the herbicidal efficacy enhancing agent composition of the present invention. In the herbicidal efficacy enhancing agent composition of the present invention, components (A), (B) and (C) and their preferable modes are the same as those mentioned in the herbicide composition of the present invention.

The herbicidal efficacy enhancing agent composition of the present invention contains component (B) in an amount of preferably 0.5 mass % or more, more preferably 1.0 mass % or more and further preferably 2.0 mass % or more from the viewpoint of enhancing the herbicidal effect, and preferably 20 mass % or less, more preferably 15 mass % or less and further preferably 10 mass % or less from the viewpoints of the formulation stability and the economic efficiency.

Note that, in the present invention, descriptions regarding mass of component (B) (mass % or a mass ratio) are calculated on the basis of amounts in terms of the amine which is not an acid salt, i.e., a non-neutralized amine.

The herbicidal efficacy enhancing agent composition of the present invention contains component (C) in an amount of preferably 1.0 mass % or more, more preferably 3.0 mass % or more and further preferably 5.0 mass % or more from the viewpoint of increasing the herbicidal effect, and preferably 20 mass % or less, more preferably 15 mass % or less and further preferably 10 mass % or less from the viewpoints of the increase in the herbicidal effect and the formulation stability.

In the herbicidal efficacy enhancing agent composition of the present invention, a mass ratio of the content of component (B) to the content of component (C), (B)/(C), is 0.25 or more, preferably 0.30 or more and more preferably 0.35 or more from the viewpoint of increasing the herbicidal effect, and 0.60 or less, preferably 0.55 or less, more preferably 0.50 or less, further preferably 0.45 or less and furthermore preferably 0.40 or less from the viewpoint of increasing the herbicidal effect.

When the herbicidal efficacy enhancing agent composition of the present invention contains the aforementioned components ($C_A$) and ($C_B$) as component (C), a proportion of the total contents of components ($C_A$) and ($C_B$) to the content of component (C), [($C_A$)+($C_B$)]/(C), is preferably 80 mass % or more, more preferably 85 mass % or more and further preferably 90 mass % or more, and preferably 100 mass % or less, and may also be 100 mass %, from the viewpoint of increasing the herbicidal effect.

When the herbicidal efficacy enhancing agent composition of the present invention contains components ($C_A$) and ($C_B$) as component (C), a mass ratio of the content of component ($C_A$) to the content of component ($C_B$), ($C_A$)/($C_B$), is preferably 0.1 or more, more preferably 0.5 or more and further preferably 1 or more, and preferably 9 or less, more preferably 6 or less, further preferably 4 or less and furthermore preferably 2 or less from the viewpoints of the formulation stability and the productivity.

In the herbicidal efficacy enhancing agent composition of the present invention, the total content of components (B) and (C) is preferably 1.0 mass % or more, more preferably 2.0 mass % or more, further preferably 3.0 mass % or more and furthermore preferably 5.0 mass % or more from the viewpoint of increasing the herbicidal effect, and preferably 20 mass % or less, more preferably 15 mass % or less and further preferably 10 mass % or less from the viewpoints of the increase in the herbicidal effect and the formulation stability.

From the viewpoints of the formulation stability and the productivity, the herbicidal efficacy enhancing agent composition of the present invention preferably further contains component (D). Component (D) and its preferable mode are the same as those mentioned in the herbicide composition of the present invention.

The herbicidal efficacy enhancing agent composition of the present invention contains component (D) in an amount of preferably 0.1 mass % or more, more preferably 0.2 mass % or more and further preferably 0.4 mass % or more from the viewpoints of the formulation stability and the productivity, and preferably 20 mass % or less, more preferably 15 mass % or less, further preferably 10 mass % or less, furthermore preferably 5 mass % or less, furthermore preferably 3 mass % or less and furthermore preferably 1 mass % or less from the viewpoint of the economic efficiency.

In the herbicidal efficacy enhancing agent composition of the present invention, a mass ratio of the content of component (C) to the content of component (D), (C)/(D), is preferably 1 or more, more preferably 2 or more, further preferably 3 or more and furthermore preferably 4 or more from the viewpoint of the economic efficiency, and preferably 10 or less, more preferably 8 or less and further preferably 6 or less from the viewpoints of the formulation stability and the productivity.

From the viewpoint of easiness to handle, the herbicidal efficacy enhancing agent composition of the present invention may be a liquid composition. In addition, it is preferably a liquid composition containing water.

The herbicidal efficacy enhancing agent composition of the present invention contains water in an amount of preferably 10 mass % or more, more preferably 20 mass % or more and further preferably 30 mass % or more from the viewpoint of the formulation stability, and preferably 80 mass % or less, more preferably 70 mass % or less and further preferably 60 mass % or less from the viewpoint of the economic efficiency.

As water, unless the effects of the herbicidal efficacy enhancing agent composition of the present invention are impaired, tap water, distilled water, deionized water and the like can be used, and deionized water is preferable from the viewpoint of the stability.

The herbicidal efficacy enhancing agent composition of the present invention can optionally contain a compound other than components (A) to (D), for example, a compound used as an oil or a surfactant.

When formulated with component (A), the herbicidal efficacy enhancing agent composition of the present invention is favorably used by formulating therewith such that a mass ratio of the total formulation amounts of components (B) and (C) to the formulation amount of component (A), [(B)+(C)]/(A), is preferably 0.04 or more, more preferably 0.06 or more, further preferably 0.08 or more and furthermore preferably 0.09 or more from the viewpoint of increasing the herbicidal effect, and preferably 1.4 or less, more preferably 1.2 or less, further preferably 1.0 or less and furthermore preferably 0.5 or less from the viewpoints of the increase in the herbicidal effect and the formulation stability. That is, in a method for producing the herbicide of the present invention, the herbicide is preferably produced by mixing the aforementioned herbicidal efficacy enhancing agent composition and component (A) such that a mass ratio of the total amounts of components (B) and (C) to the amount of component (A), [(B)+(C)]/(A), is in the aforementioned range.

The present invention provides use, as a herbicidal efficacy enhancing agent, of a composition containing components (B) and (C), wherein a mass ratio of the content of component (B) to the content of component (C), (B)/(C), is 0.25 or more and 0.6 or less. The aspects mentioned in the herbicide composition, the weeding method and the herbicidal efficacy enhancing agent composition of the present invention can be appropriately applied to the use as a herbicidal efficacy enhancing agent of the present invention. In the use as a herbicidal efficacy enhancing agent of the present invention, components (A), (B) and (C) and their preferable modes are the same as those mentioned in the herbicide composition of the present invention.

With reference to the aforementioned embodiments, the present invention further discloses the following herbicide compositions, weeding methods and herbicidal efficacy enhancing agent compositions. The matters mentioned in the herbicide composition, the weeding method and the herbicidal efficacy enhancing agent composition of the present invention can be mutually and appropriately applied to these aspects.

<1>

A herbicide composition containing the following components (A) to (C),
wherein a mass ratio of the content of component (B) to the content of component (C), (B)/(C), is 0.25 or more and 0.6 or less:

component (A): an agrochemical active ingredient of an amino acid-based herbicide;

component (B): a compound represented by the following general formula (b1) or an acid salt thereof:

wherein $R^{1b}$ is a hydrocarbon group with 8 or more and 14 or less carbons, and $A^{1b}O$ is an alkyleneoxy group with 2 or more and 4 or less carbons; each of m and n is independently an average number of added moles of $A^{1b}O$, which is a number of 0 or more, and the sum of m and n is a number of 0 or more and 50 or less; and each of $R^{2b}$ and $R^{3b}$ is independently a hydrogen atom or a methyl group; and component (C): a compound represented by the following general formula (c1):

wherein $R^{1c}$ is a hydrocarbon group with 10 or more and 22 or less carbons, and $A^{1c}O$ is an alkyleneoxy group with 2 or more and 4 or less carbons; and s is an average number of added moles of $A^{1c}O$, which is a number of 2 or more and 50 or less.

<2>

The herbicide composition according to <1>, wherein component (A) is one or more selected from glyphosate [N-(phosphonomethyl)glycine or a salt thereof], bialaphos [a sodium salt of L-2-amino-4-[(hydroxy) (methyl)=phosphinoyl]butyryl-L-alanyl-L-alanine] and glufosinate [ammonium-DL-homoalanine-4-yl(methyl)phosphinate], preferably glyphosate or glufosinate and more preferably glyphosate.

<3>

The herbicide composition according to <1> or <2>, wherein $R^{1b}$ is a hydrocarbon group, preferably an alkyl group or an alkenyl group, more preferably an alkyl group and further preferably a linear alkyl group.

<4>

The herbicide composition according to any of <1> to <3>, wherein $R^{1b}$ has 8 or more, preferably 10 or more and more preferably 12 or more, and 14 or less carbons.

<5>

The herbicide composition according to any of <1> to <4>, wherein $A^{1b}O$ is an alkyleneoxy group with 2 or more, and 4 or less and preferably 3 or less carbons, and more preferably an ethyleneoxy group.

<6>

The herbicide composition according to any of <1> to <5>, wherein the sum of m and n is a number of preferably 1 or more, more preferably 3 or more and further preferably 5 or more, and preferably 20 or less, more preferably 15 or less and further preferably 10 or less.

<7>

The herbicide composition according to any of <1> to <5>, wherein the sum of m and n is preferably 5 or less and more preferably 2 or less, and 0 or more.

<8>

The herbicide composition according to any of <1> to <5>, wherein the sum of m and n is 0.

<9>

The herbicide composition according to any of <1> to <8>, wherein $R^{2b}$ and $R^{3b}$ are preferably hydrogen atoms when the sum of m and n is more than 0, and preferably methyl groups when the sum of m and n is 0.

<10>

The herbicide composition according to any of <1> to <9>, containing as component (B) a component in which $R^{2b}$ and $R^{3b}$ are hydrogen atoms and the sum of m and n is more than 0 (hereinafter, referred to as component ($B_A$)) and a component in which $R^{2b}$ and $R^{3b}$ are methyl groups and the sum of m and n is 0 (hereinafter, referred to as component ($B_B$)).

<11>

The herbicide composition according to any of <1> to <10>, wherein $R^{1c}$ is a hydrocarbon group, preferably a linear hydrocarbon group and more preferably a linear alkyl group or alkenyl group.

<12>
The herbicide composition according to any of <1> to <11>, wherein $R^{1c}$ has 10 or more and preferably 12 or more, and 22 or less, preferably 20 or less and more preferably 18 or less carbons.
<13>
The herbicide composition according to any of <1> to <10>, wherein $R^{1c}$ is an alkyl group with 10 or more and preferably 12 or more, and preferably 14 or less and more preferably 12 carbons.
<14>
The herbicide composition according to any of <1> to <10>, wherein $R^{1c}$ is an alkenyl group with 16 or more, and 22 or less, preferably 18 or less and more preferably 18 carbons.
<15>
The herbicide composition according to any of <1> to <14>, wherein $A^{1c}O$ is an alkyleneoxy group with 2 or more, and 4 or less and preferably 3 or less carbons, and preferably an ethyleneoxy group.
<16>
The herbicide composition according to any of <1> to <15>, wherein, in $A^{1c}O$, a proportion of an ethyleneoxy group is preferably 50 mass % or more, more preferably 70 mass % or more and further preferably 90 mass % or more, and preferably 100 mass % or less.
<17>
The herbicide composition according to any of <1> to <15>, wherein, in $A^{1c}O$, a proportion of an ethyleneoxy group is 100 mass %.
<18>
The herbicide composition according to any of <1> to <17>, wherein s is a number of preferably 2 or more, more preferably 6 or more and further preferably 9 or more, and preferably 30 or less, more preferably 24 or less, further preferably 20 or less, furthermore preferably 15 or less and furthermore preferably 10 or less.
<19>
The herbicide composition according to any of <1> to <18>, wherein, in all component (C), a proportion of a compound in which $A^{1c}O$ in the general formula (c1) is an alkyleneoxy group with 3 or 4 carbons is preferably 50 mass % or less, more preferably 40 mass % or less, further preferably 20 mass % or less and furthermore preferably 10 mass % or less.
<20>
The herbicide composition according to any of <1> to <18>, wherein, in all component (C), a proportion of a compound in which $A^{1c}O$ in the general formula (c1) is an alkyleneoxy group with 3 or 4 carbons is 0 mass %.
<21>
The herbicide composition according to any of <1> to <20>, containing as component (C) a compound represented by the following general formula (c2) (hereinafter, referred to as component ($C_A$)) and a compound represented by the following general formula (c3) (hereinafter, referred to as component ($C_B$)):

wherein $R^{2c}$ is a hydrocarbon group with 10 or more and 22 or less carbons, and EO is an ethyleneoxy group; and r is an average number of added moles of EO, which is a number of 2 or more and 50 or less; and

wherein $R^{3c}$ is a hydrocarbon group with 10 or more and 22 or less carbons, EO is an ethyleneoxy group, and PO is a propyleneoxy group; p and q are average numbers of added moles of EO and PO, respectively, p is a number of 0 or more, q is a number of more than 0, and the sum of p and q is a number of 2 or more and 50 or less; and when p is more than 0, "/" indicates that the arrangements of EO and PO may be block or random.
<22>
The herbicide composition according to <21>, wherein, for component ($C_B$), p is a number of 0 or more, preferably 2 or more, more preferably 4 or more and further preferably 6 or more, and preferably 20 or less, more preferably 15 or less and further preferably 10 or less.
<23>
The herbicide composition according to <21> or <22>, wherein, for component ($C_B$), q is a number of more than 0, preferably 0.5 or more, more preferably 1 or more and further preferably 1.5 or more, and preferably 10 or less, more preferably 7 or less, further preferably 5 or less and furthermore preferably 3 or less.
<24>
The herbicide composition according to any of <21> to <23>, wherein, for component ($C_B$), the sum of p and q is a number of 2 or more, preferably 3 or more and more preferably 6 or more, and 50 or less, preferably 30 or less, more preferably 25 or less, further preferably 20 or less and furthermore preferably 10 or less.
<25>
The herbicide composition according to any of <21> to <24>, wherein, for component ($C_B$), a ratio of q to the sum of p and q, [q/(p+q)], is preferably 0.01 or more and more preferably 0.1 or more, and preferably 0.5 or less and more preferably 0.3 or less.
<26>
The herbicide composition according to any of <21> to <25>, wherein, for component ($C_B$), the arrangements of PO and EO are preferably a block arrangement and more preferably a block arrangement in the order of $EO_{p1}$, $PO_q$ and $EO_{p2}$ to $R^{3c}$—O—.
<27>
The herbicide composition according to any of <1> to <26>, containing component (A) in an amount of preferably 20 mass % or more, more preferably 30 mass % or more and further preferably 40 mass % or more, and preferably 70 mass % or less, more preferably 60 mass % or less and further preferably 50 mass % or less.
<28>
The herbicide composition according to any of <1> to <27>, containing component (B) in an amount of preferably 0.5 mass % or more, more preferably 1.0 mass % or more and further preferably 2.0 mass % or more, and preferably 20 mass % or less, more preferably 15 mass % or less, further preferably 10 mass % or less and furthermore preferably 5.0 mass % or less.
<29>
The herbicide composition according to any of <1> to <28>, containing component (C) in an amount of preferably 1.0 mass % or more, more preferably 3.0 mass % or more and further preferably 5.0 mass % or more, and preferably 20 mass % or less, more preferably 15 mass % or less and further preferably 10 mass % or less.
<30>
The herbicide composition according to any of <1> to <29>, wherein a mass ratio of the content of component (B) to the content of component (C), (B)/(C), is preferably 0.30 or more and more preferably 0.35 or more, and preferably 0.55 or less, more preferably 0.50 or less, further preferably 0.45 or less and furthermore preferably 0.40 or less.

<31>

The herbicide composition according to any of <21> to <29>, wherein, when components ($C_A$) and ($C_B$) are contained as component (C), a proportion of the total contents of components ($C_A$) and ($C_B$) to the content of component (C), [($C_A$)+($C_B$)]/(C), is preferably 80 mass % or more, more preferably 85 mass % or more and further preferably 90 mass % or more, and preferably 100 mass % or less.

<32>

The herbicide composition according to any of <21> to <29>, wherein, when components ($C_A$) and ($C_B$) are contained as component (C), a proportion of the total contents of components ($C_A$) and ($C_B$) to the content of component (C), [($C_A$)+($C_B$)]/(C), is 100 mass %.

<33>

The herbicide composition according to any of <21> to <32>, wherein, when components ($C_A$) and ($C_B$) are contained as component (C), a mass ratio of the content of component ($C_A$) to the content of component ($C_B$), ($C_A$)/($C_B$), is preferably 0.1 or more, more preferably 0.5 or more and further preferably 1 or more, and preferably 9 or less, more preferably 6 or less, further preferably 4 or less and furthermore preferably 2 or less.

<34>

The herbicide composition according to any of <1> to <33>, wherein the total content of components (B) and (C) is preferably 1.0 mass % or more, more preferably 2.0 mass % or more, further preferably 3.0 mass % or more, furthermore preferably 4.0 mass % or more and furthermore preferably 5.0 mass % or more, and preferably 20 mass % or less, more preferably 15 mass % or less and further preferably 10 mass % or less.

<35>

The herbicide composition according to any of <1> to <34>, wherein a mass ratio of the total contents of components (B) and (C) to the content of component (A), [(B)+(C)]/(A), is preferably 0.04 or more, more preferably 0.06 or more, further preferably 0.08 or more and furthermore preferably 0.09 or more, and preferably 1.4 or less, more preferably 1.2 or less, further preferably 1.0 or less and furthermore preferably 0.5 or less.

<36>

The herbicide composition according to any of <1> to <35>, containing as component (D) a compound represented by the following general formula (d1):

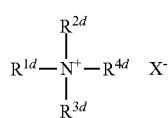

(d1)

wherein $R^{1d}$ is a hydrocarbon group with 8 or more and 18 or less carbons, each of $R^{2d}$ and $R^{3d}$ is independently a methyl group, an ethyl group, a hydroxyethyl group or a hydroxypropyl group, and Rod is a methyl group, an ethyl group or a benzyl group; and $X^-$ is an anion.

<37>

The herbicide composition according to <36>, wherein $R^{1d}$ is a hydrocarbon group, preferably a linear or branched alkyl group or alkenyl group, and more preferably a linear alkyl group.

<38>

The herbicide composition according to <36> or <37>, wherein $R^{1d}$ has 8 or more, preferably 10 or more and more preferably 12 or more, and 18 or less and preferably 14 or less carbons.

<39>

The herbicide composition according to any of <36> to <38>, wherein each of $R^{2d}$ and $R^{3d}$ is independently preferably a methyl group or a hydroxyethyl group and more preferably a methyl group.

<40>

The herbicide composition according to any of <36> to <39>, wherein Rod is preferably a methyl group.

<41>

The herbicide composition according to any of <36> to <39>, wherein Rod is preferably a benzyl group.

<42>

The herbicide composition according to any of <36> to <41>, wherein $X^-$ is preferably a chloride ion, a bromide ion, a methyl sulfuric acid ion or an ethyl sulfuric acid ion, and more preferably a chloride ion.

<43>

The herbicide composition according to any of <36> to <42>, containing component (D) in an amount of preferably 0.1 mass % or more, more preferably 0.2 mass % or more and further preferably 0.4 mass % or more, and preferably 20 mass % or less, more preferably 15 mass % or less, further preferably 10 mass % or less, furthermore preferably 5 mass % or less, furthermore preferably 3 mass % or less and furthermore preferably 1 mass % or less.

<44>

The herbicide composition according to any of <36> to <43>, wherein a mass ratio of the content of component (C) to the content of component (D), (C)/(D), is preferably 1 or more, more preferably 2 or more, further preferably 3 or more and furthermore preferably 4 or more, and preferably 10 or less, more preferably 8 or less and further preferably 6 or less.

<45>

The herbicide composition according to any of <1> to <44>, which is a liquid composition and preferably a liquid composition containing water.

<46>

The herbicide composition according to <45>, containing water in an amount of preferably 10 mass % or more, more preferably 20 mass % or more and further preferably 30 mass % or more, and preferably 80 mass % or less, more preferably 70 mass % or less and further preferably 60 mass % or less.

<47>

A weeding method including spraying a herbicidal spray liquid prepared from the herbicide composition according to any of <1> to <46> to plants.

<48>

The weeding method according to <47>, wherein the herbicide composition is used by diluting with water such that the total content of components (A), (B) and (C) in the herbicidal spray liquid is preferably 1,000 ppm or more, more preferably 1,500 ppm or more and further preferably 2,000 ppm or more, and preferably 10,000 ppm or less, more preferably 8,000 ppm or less and further preferably 6,000 ppm or less.

<49>

The weeding method according to <47> or <48>, wherein the herbicidal spray liquid is sprayed at a proportion of preferably 0.5 L/ha or more, more preferably 50 L/ha or more, further preferably 200 L/ha or more and furthermore preferably 500 L/ha or more, and preferably 2000 L/ha or less, more preferably 1500 L/ha or less, further preferably 1200 L/ha or less and furthermore preferably 1000 L/ha or less.

<50>

The weeding method according to any of <47> to <49>, including spraying the herbicidal spray liquid to plants to be eradicated, or weeds.

<51>

The weeding method according to <50>, wherein the weeds are gramineous weeds, preferably a gramineous weed selected from *Echinochloa crus-galli*, *Setaria viridis*, *Setaria pumila*, *Setaria viridis* f. *misera*, *Poa annua*, *Alopecurus aequalis*, *Eragrostis multicaulis* stead., *Digitaria violascens* Link., *Digitaria ciliaris*, *Eragrostis ferruginea*, *Dactylis glomerata* (orchard grass), *Miscanthus sinensis*, *Paspalum thunbergii* Kunth ex Steud., *Imperata cylindrica* (L.) P. Beauv., *Pennisetum alopecuroides*, *Phragmites australis* and bamboo grass, and more preferably *Echinochloa crus-galli*.

<52>

A herbicidal efficacy enhancing agent composition containing the following components (B) and (C),
wherein a mass ratio of the content of component (B) to the content of component (C), (B)/(C), is 0.25 or more and 0.6 or less:
component (B): a compound represented by the following general formula (b1) or an acid salt thereof:

$$R^{1b}-N\begin{matrix}(A^{1b}O)_m-R^{2b}\\ (A^{1b}O)_n-R^{3b}\end{matrix}$$ (b1)

wherein $R^{1b}$ is a hydrocarbon group with 8 or more and 14 or less carbons, and $A^{1b}O$ is an alkyleneoxy group with 2 or more and 4 or less carbons; each of m and n is independently an average number of added moles of $A^{1b}O$, which is a number of 0 or more, and the sum of m and n is a number of 0 or more and 50 or less; and each of $R^{2b}$ and $R^{3b}$ is independently a hydrogen atom or a methyl group; and
component (C): a compound represented by the following general formula (c1):

$$R^{1c}-O-(A^{1c}O)_s-H$$ (c1)

wherein $R^{1c}$ is a hydrocarbon group with 10 or more and 22 or less carbons, and $A^{1c}O$ is an alkyleneoxy group with 2 or more and 4 or less carbons; and s is an average number of added moles of $A^{1c}O$, which is a number of 2 or more and 50 or less.

<53>

The herbicidal efficacy enhancing agent composition according to <52>, for use in a herbicide containing an agrochemical active ingredient of an amino acid-based herbicide (component (A)), preferably glyphosate or glufosinate, and more preferably glyphosate.

<54>

The herbicidal efficacy enhancing agent composition according to <52> or <53>, wherein, in the general formula (c1) of component (C), s is a number of 6 or more and 24 or less.

<55>

The herbicidal efficacy enhancing agent composition according to any of <52> to <54>, wherein, in the general formula (b1) of component (B), the sum of m and n is a number of 5 or more and 15 or less.

<56>

The herbicidal efficacy enhancing agent composition according to any of <52> to <55>, containing component (B) in an amount of preferably 0.5 mass % or more, more preferably 1.0 mass % or more and further preferably 2.0 mass % or more, and preferably 20 mass % or less, more preferably 15 mass % or less and further preferably 10 mass % or less.

<57>

The herbicidal efficacy enhancing agent composition according to any of <52> to <56>, containing component (C) in an amount of preferably 1.0 mass % or more, more preferably 3.0 mass % or more and further preferably 5.0 mass % or more, and preferably 20 mass % or less, more preferably 15 mass % or less and further preferably 10 mass % or less.

<58>

The herbicidal efficacy enhancing agent composition according to any of <52> to <57>, wherein a mass ratio of the content of component (B) to the content of component (C), (B)/(C), is preferably 0.30 or more and more preferably 0.35 or more, and preferably 0.55 or less, more preferably 0.50 or less, further preferably 0.45 or less and furthermore preferably 0.40 or less.

<59>

The herbicidal efficacy enhancing agent composition according to any of <52> to <58>, wherein the total content of components (B) and (C) is preferably 1.0 mass % or more, more preferably 2.0 mass % or more, further preferably 3.0 mass % or more and furthermore preferably 5.0 mass % or more, and preferably 20 mass % or less, more preferably 15 mass % or less and further preferably 10 mass % or less.

<60>

The herbicidal efficacy enhancing agent composition according to any of <52> to <59>, containing as component (C) a compound represented by the following general formula (c2) (hereinafter, referred to as component ($C_A$)) and a compound represented by the following general formula (c3) (hereinafter, referred to as component ($C_B$)):

$$R^{2c}-O-(EO)_r-H$$ (c2)

wherein $R^{2c}$ is a hydrocarbon group with 10 or more and 22 or less carbons, and EO is an ethyleneoxy group; and r is an average number of added moles of EO, which is a number of 2 or more and 50 or less; and $$R^{3c}-O-[(EO)_p/(PO)_q]-H$$ (c3)

wherein $R^{3c}$ is a hydrocarbon group with 10 or more and 22 or less carbons, EO is an ethyleneoxy group, and PO is a propyleneoxy group; p and q are average numbers of added moles of EO and PO, respectively, p is a number of 0 or more, q is a number of more than 0, and the sum of p and q is a number of 2 or more and 50 or less; and "/" indicates that the arrangements of EO and PO may be block or random.

<61>

The herbicidal efficacy enhancing agent composition according to <60>, wherein a proportion of the total contents of components ($C_A$) and ($C_B$) to the content of component (C), [($C_A$)+($C_B$)]/(C), is preferably 80 mass % or more, more preferably 85 mass % or more and further preferably 90 mass % or more, and preferably 100 mass % or less.

<62>

The herbicidal efficacy enhancing agent composition according to <60>, wherein a proportion of the total contents of components ($C_A$) and ($C_B$) to the content of component (C), [($C_A$)+($C_B$)]/(C), is 100 mass %.

<63>

The herbicidal efficacy enhancing agent composition according to any of <60> to <62>, wherein a mass ratio of the content of component ($C_A$) to the content of component ($C_B$), ($C_A$)/($C_B$), is preferably 0.1 or more, more preferably 0.5 or more and further preferably 1 or more, and preferably 9 or less, more preferably 6 or less, further preferably 4 or less and furthermore preferably 2 or less.

<64>

The herbicidal efficacy enhancing agent composition according to any of <52> to <63>, further containing the following component (D):

component (D): a compound represented by the following general formula (d1):

$$R^{1d}-\overset{R^{2d}}{\underset{R^{3d}}{N^+}}-R^{4d} \quad X^-  \qquad (d1)$$

wherein $R^{1d}$ is a hydrocarbon group with 8 or more and 18 or less carbons, each of $R^{2d}$ and $R^{3d}$ is independently a methyl group, an ethyl group, a hydroxyethyl group or a hydroxypropyl group, and Rod is a methyl group, an ethyl group or a benzyl group; and $X^-$ is an anion.

<65>

The herbicidal efficacy enhancing agent composition according to <64>, containing component (D) in an amount of preferably 0.1 mass % or more, more preferably 0.2 mass % or more and further preferably 0.4 mass % or more, and preferably 20 mass % or less, more preferably 15 mass % or less, further preferably 10 mass % or less, furthermore preferably 5 mass % or less, furthermore preferably 3 mass % or less and furthermore preferably 1 mass % or less.

<66>

The herbicidal efficacy enhancing agent composition according to <64> or <65>, wherein a mass ratio of the content of component (C) to the content of component (D), (C)/(D), is preferably 1 or more, more preferably 2 or more, further preferably 3 or more and furthermore preferably 4 or more, and preferably 10 or less, more preferably 8 or less and further preferably 6 or less.

<67>

The herbicidal efficacy enhancing agent composition according to any of <52> to <66>, which is a liquid composition and preferably a liquid composition containing water.

<68>

The herbicidal efficacy enhancing agent composition according to <67>, containing water in an amount of preferably 10 mass % or more, more preferably 20 mass % or more and further preferably 30 mass % or more, and preferably 80 mass % or less, more preferably 70 mass % or less and further preferably 60 mass % or less.

<69>

The herbicidal efficacy enhancing agent composition according to any of <52> to <68>, wherein the herbicidal efficacy enhancing agent composition is used by formulating with the following component (A) such that a mass ratio of the total formulation amounts of components (B) and (C) to the formulation amount of component (A), [(B)+(C)]/(A), is preferably 0.04 or more, more preferably 0.06 or more, further preferably 0.08 or more and furthermore preferably 0.09 or more, and preferably 1.4 or less, more preferably 1.2 or less, further preferably 1.0 or less and furthermore preferably 0.5 or less:

component (A): an agrochemical active ingredient of an amino acid-based herbicide.

<70>

Use, as a herbicidal efficacy enhancing agent, of a composition containing the following components (B) and (C), wherein a mass ratio of the content of component (B) to the content of component (C), (B)/(C), is 0.25 or more and 0.6 or less:

component (B): a compound represented by the following general formula (b1) or an acid salt thereof:

$$R^{1b}-N\begin{matrix}(A^{1b}O)_m-R^{2b}\\ (A^{1b}O)_n-R^{3b}\end{matrix}  \qquad (b1)$$

wherein $R^{1b}$ is a hydrocarbon group with 8 or more and 14 or less carbons, and $A^{1b}O$ is an alkyleneoxy group with 2 or more and 4 or less carbons; each of m and n is independently an average number of added moles of $A^{1b}O$, which is a number of 0 or more, and the sum of m and n is a number of 0 or more and 50 or less; and each of $R^{2b}$ and $R^{3b}$ is independently a hydrogen atom or a methyl group; and component (C): a compound represented by the following general formula (c1):

$$R^{1c}-O-(A^{1c}O)_s-H \qquad (c1)$$

wherein $R^{1c}$ is a hydrocarbon group with 10 or more and 22 or less carbons, and $A^{1c}O$ is an alkyleneoxy group with 2 or more and 4 or less carbons; and s is an average number of added moles of $A^{1c}O$, which is a number of 2 or more and 50 or less.

EXAMPLES

Example 1 and Comparative Example 1

Using any of the following formulation components, herbicide compositions shown in Tables 1 and 2 were prepared and evaluations of the following items were performed on them. The results are shown in Tables 1 and 2. The herbicide compositions of Tables 1 and 2 were prepared in the usual manner. That is, components (A) through (D) and (B') in formulation amounts in the tables were added to an appropriate amount of ion exchange water and dissolved therein at room temperature (25° C.). Note that mass % of formulation components in Tables 1 and 2 are all numerical values based on the active components.

<Formulation Components>

Component (A)

Glyphosate isopropylamine salt: manufactured by ALDRICH

Component (B)

Polyoxyethylene (5) coco amine: manufactured by Kao Corporation, "AMIET 105", a compound for which, in the general formula (b1), $R^{1b}$ is mainly composed of a linear alkyl group with 12, 14 carbons, $A^{1b}O$ is an ethyleneoxy group, the sum of m and n is 5, and $R^{2b}$ and $R^{3b}$ are hydrogen atoms Dimethyl lauryl amine: manufactured by Kao Corporation, "FARMIN DM2098", a compound for which, in the general formula (b1), $R^{1b}$ is a linear alkyl group with 12 carbons, the sum of m and n is 0, and $R^{2b}$ and $R^{3b}$ are hydrogen atoms Polyoxyethylene (10) lauryl amine: manufactured by AOKI OIL INDUSTRIAL Co., Ltd., "BLAUNON L210", a compound for which, in the general formula (b1), $R^{1b}$ is a linear alkyl group with 12 carbons, $A^{1b}O$ is an ethyleneoxy group, the sum of m and n is 10, and $R^{2b}$ and $R^{3b}$ are hydrogen atoms Polyoxyethylene (15) lauryl amine: a synthetic product prepared by performing an addition reaction of, on average, 15 moles of an ethylene oxide to a lauryl amine (manufactured by Kao Corporation, "FARMIN D20") in the usual manner, a compound for which, in the general formula (b1), $R^{1b}$ is a linear alkyl group with 12 carbons, $A^{1b}O$ is an ethyleneoxy group, the sum of m and n is 15, and $R^{2b}$ and $R^{3b}$ are hydrogen atoms Component (B') (a Comparative Component of Component (B))

Polyoxyethylene (15) tallow amine: manufactured by AOKI OIL INDUSTRIAL Co., Ltd., "BLAUNON S215T", a compound for which, in the general formula (b1), $R^{1b}$ is mainly composed of a linear alkyl group or alkenyl group with 16, 18 carbons, $A^{1b}O$ is an ethyleneoxy group, the sum of m and n is 15, and $R^{2b}$ and $R^{3b}$ are hydrogen atoms Component (C)

Polyoxyethylene (12) lauryl ether: component ($C_A$), a compound for which $R^{2c}$ is a linear alkyl group with 12 carbons and r is 12 in the general formula (c2)

Polyoxyethylene (6) lauryl ether: component ($C_A$), a compound for which $R^{2c}$ is a linear alkyl group with 12 carbons and r is 6 in the general formula (c2)

Polyoxyethylene (9) lauryl ether: component ($C_A$), a compound for which $R^{2c}$ is a linear alkyl group with 12 carbons and r is 9 in the general formula (c2)

Polyoxyethylene (23) lauryl ether: component ($C_A$), a compound for which $R^{2c}$ is a linear alkyl group with 12 carbons and r is 23 in the general formula (c2)

Polyoxyethylene (7) decyl ether: component ($C_A$), a compound for which $R^{2c}$ is a linear alkyl group with 10 carbons and r is 7 in the general formula (c2)

Polyoxyethylene (10) lauryl ether: component ($C_A$), a compound for which $R^{2c}$ is a linear alkyl group with 12 carbons and r is 10 in the general formula (c2)

Polyoxyethylene (10) oleyl ether: component ($C_A$), a compound for which $R^{2c}$ is a linear alkenyl group with 18 carbons and r is 10 in the general formula (c2)

POE (3) POP (1.5) POE (3) C12-14 ether: component ($C_B$), a compound for which, in the general formula (c3), $R^{3c}$ is a linear alkyl group with 12 or 14 carbons, $EO_{p1}$, $PO_q$ and $EO_{p2}$ are arranged in blocks to $R^{3c}$—O— in this order, p1 is 3, q is 1.5 and p2 is 3

Component (D)

Coco alkyltrimethylammonium chloride: a compound for which, in the general formula (d1), $R^{1d}$ is mainly composed of a linear alkyl group with 12, 14 carbons, $R^{2b}$, $R^{3b}$ and $R^{4d}$ are methyl groups and $X^-$ is a chloride ion Coco alkyldimethylbenzyl ammonium chloride: a compound for which, in the general formula (d1), $R^{1d}$ is mainly composed of a linear alkyl group with 12, 14 carbons, Red and $R^{3d}$ are methyl groups, Rod is a benzyl group and $X^-$ is a chloride ion

[Herbicidal Capability Testing]

*Echinochloa crus-galli* was grown in 9 cm pots and the plant bodies with a plant height of about 40 cm were subjected to the testing. 6.7 g of each herbicide composition of Tables 1 and 2 was added to 1 L of water and homogeneously stirred therein to prepare each herbicidal spray liquid. Each herbicidal spray liquid prepared was sprayed in a spraying amount equivalent to 25 L/10 a to the leaves of *Echinochloa crus-galli* in 5 pots to spread over the entire plant bodies. The herbicidal activity 21 days after the foliar spraying was evaluated.

The evaluation of the herbicidal activity was visually judged, and the evaluation was performed such that the state of an untreated pot to which the herbicide was not sprayed was given a mark of 0 point and the state in which an above-ground portion of *Echnochloa crus-galli* completely withered up was given a mark of 10 points. In the evaluation, the herbicidal effect was judged for every pot and mean values of those evaluation scores are shown in Tables 1 and 2. It is suggested that the higher the numerical value is, the higher the herbicidal efficacy is.

[Formulation Stability Testing]

10 g of each herbicide composition in Table 2 in a state of a homogeneous liquid immediately after the preparation was put into a transparent glass container (20 mL in capacity) and stored for a day in an incubator at 55° C., stored for a day at room temperature (about 25° C.), or stored for a day in an incubator at 0° C., and the respective appearances were visually observed and the formulation stability was judged by the following criteria. The results are shown in Table 2.

Homogeneous: not separated into two layers but homogeneous

Separated: separated into two layers

TABLE 1

| | | | | Example 1 | | | | | | | | | |
|---|---|---|---|---|---|---|---|---|---|---|---|---|---|
| | | | | 1-1 | 1-2 | 1-3 | 1-4 | 1-5 | 1-6 | 1-7 | 1-8 | 1-9 | 1-11 |
| Herbicide composition | Formulation composition (mass %) | (A) | Glyphosate isopropylamine salt | 41.5 | 41.5 | 41.5 | 41.5 | 41.5 | 41.5 | 41.5 | 41.5 | 41.5 | 41.5 |
| | | (B) | Polyoxyethylene (5) coco amine | 2.5 (2.2) | 3.0 (2.6) | 3.4 (2.9) | 3.7 (3.2) | | | | 3.0 (2.6) | 3.0 (2.6) | 3.0 (2.6) |
| | | | Dimethyl lauryl amine | | | | | 3.0 (3.0) | | | | | |
| | | | Polyoxyethylene (10) lauryl amine | | | | | | 3.0 (3.0) | | | | |
| | | | Polyoxyethylene (15) lauryl amine | | | | | | | 3.0 (3.0) | | | |
| | | (B') | Polyoxyethylene (15) tallow amine | | | | | | | | | | |

TABLE 1-continued

| | | | | | | | | | | | | | |
|---|---|---|---|---|---|---|---|---|---|---|---|---|---|
| | | (C) | Polyoxyethylene (12) lauryl ether | 7.5 | 7.0 | 6.6 | 6.3 | 7.0 | 7.0 | 7.0 | | | |
| | | | Polyoxyethylene (6) lauryl ether | | | | | | | | 7.0 | | |
| | | | Polyoxyethylene (9) lauryl ether | | | | | | | | | 7.0 | |
| | | | Polyoxyethylene (23) lauryl ether | | | | | | | | | | 7.0 |
| | | | Polyoxyethylene (7) decyl ether | | | | | | | | | | |
| | | | Polyoxyethylene (10) lauryl ether | | | | | | | | | | |
| | | | Polyoxyethylene (10) oleyl ether | | | | | | | | | | |
| | Water | | | Balance | Balance | Balance | Balance | Balance | Balance | Balance | Balance | Balance | Balance |
| | Total | | | 100 | 100 | 100 | 100 | 100 | 100 | 100 | 100 | 100 | 100 |
| | (B)/(C) (mass ratio) | | | 0.29 | 0.37 | 0.44 | 0.51 | 0.43 | 0.43 | 0.43 | 0.37 | 0.37 | 0.37 |
| | (B) + (C) (mass %) | | | 9.7 | 9.6 | 9.5 | 9.5 | 10.0 | 10.0 | 10.0 | 9.6 | 9.6 | 9.6 |
| | [(B) + (C)]/(A) (mass ratio) | | | 0.23 | 0.23 | 0.23 | 0.23 | 0.24 | 0.24 | 0.24 | 0.23 | 0.23 | 0.23 |
| Weeding evaluation (score) | | | | 7.8 | 8.6 | 7.8 | 7.8 | 7.8 | 8.2 | 8.2 | 7.8 | 8.0 | 7.6 |

| | | | | Example 1 | | | | | | | Comparative example 1 | | |
|---|---|---|---|---|---|---|---|---|---|---|---|---|---|
| | | | | 1-11 | 1-12 | 1-13 | 1-14 | 1-15 | 1-16 | 1-17 | 1-1 | 1-2 | 1-3 |
| Herbicide composition | Formulation composition (mass %) | (A) | Glyphosate isopropylamine salt | 41.5 | 41.5 | 41.5 | 41.5 | 41.5 | 41.5 | 41.5 | 41.5 | 41.5 | 41.5 |
| | | (B) | Polyoxyethylene (5) coco amine | 2.1 (1.8) | 1.5 (1.3) | 0.9 (0.77) | 0.6 (0.52) | 3.0 (2.6) | 3.0 (2.6) | 3.0 (2.6) | 2.0 (1.7) | 4.5 (3.7) | |
| | | | Dimethyl lauryl amine | | | | | | | | | | |
| | | | Polyoxyethylene (10) lauryl amine | | | | | | | | | | |
| | | | Polyoxyethylene (15) lauryl amine | | | | | | | | | | |
| | | (B') | Polyoxyethylene (15) tallow amine | | | | | | | | | | 3.0 |
| | | (C) | Polyoxyethylene (12) lauryl ether | 4.9 | 3.5 | 2.1 | 1.4 | | | | 8.0 | 5.7 | 7.0 |
| | | | Polyoxyethylene (6) lauryl ether | | | | | | | | | | |
| | | | Polyoxyethylene (9) lauryl ether | | | | | | | | | | |
| | | | Polyoxyethylene (23) lauryl ether | | | | | | | | | | |
| | | | Polyoxyethylene (7) decyl ether | | | | | 7.0 | | | | | |
| | | | Polyoxyethylene (10) lauryl ether | | | | | | 7.0 | | | | |
| | | | Polyoxyethylene (10) oleyl ether | | | | | | | 7.0 | | | |
| | Water | | | Balance | Balance | Balance | Balance | Balance | Balance | Balance | Balance | Balance | Balance |
| | Total | | | 100 | 100 | 100 | 100 | 100 | 100 | 100 | 100 | 100 | 100 |
| | (B)/(C) (mass ratio) | | | 0.37 | 0.37 | 0.37 | 0.37 | 0.37 | 0.37 | 0.37 | 0.21 | 0.65 | — |
| | (B) + (C) (mass %) | | | 6.7 | 4.8 | 2.9 | 1.9 | 9.6 | 9.6 | 9.6 | 9.7 | 9.4 | 7.0 |
| | [(B) + (C)]/(A) (mass ratio) | | | 0.16 | 0.12 | 0.07 | 0.05 | 0.23 | 0.23 | 0.23 | 0.23 | 0.23 | 0.17 |
| Weeding evaluation (score) | | | | 8.4 | 8.2 | 7.6 | 7.2 | 7.6 | 8.4 | 8.4 | 6.4 | 6.6 | 6.6 |

TABLE 2

| | | | | Example 1 | | | | Comparative example 1 |
|---|---|---|---|---|---|---|---|---|
| | | | | 1-18 | 1-19 | 1-20 | 1-21 | 1-4 |
| Herbicide composition | Formulation composition (mass %) | (A) | Glyphosate isopropylamine salt | 41.5 | 41.5 | 41.5 | 41.5 | 41.5 |
| | | (B) | Polyoxyethylene (5) coco amine | 1.2 (1.0) | 1.2 (1.0) | 1.06 (0.91) | 1.00 (0.86) | |
| | | (B') | Polyoxyethylene (15) tallow amine | | | | | 1.2 |

TABLE 2-continued

|  |  |  | Example 1 | | | | Comparative example 1 |
| --- | --- | --- | --- | --- | --- | --- | --- |
|  |  |  | 1-18 | 1-19 | 1-20 | 1-21 | 1-4 |
| | (C) | ($C_A$) Polyoxyethylene (12) lauryl ether | 2.8 | | 1.48 | 1.39 | 2.8 |
| | | ($C_B$) POE (3) POP (1.5) POE (3) C12-14 ether | | 2.8 | 0.98 | 0.93 | |
| | (D) | Coco alkyltrimethylammonium chloride | | | 0.48 | | |
| | | Coco alkyldimethylbenzyl ammonium chloride | | | | 0.68 | |
| Water | | | Balance | Balance | Balance | Balance | Balance |
| Total | | | 100 | 100 | 100 | 100 | 100 |
| (B)/(C) (mass ratio) | | | 0.37 | 0.37 | 0.37 | 0.37 | — |
| (B) + (C) (mass %) | | | 3.8 | 3.8 | 3.37 | 3.18 | 2.8 |
| ($C_A$)/($C_B$) (mass ratio) | | | — | — | 1.5 | 1.5 | — |
| [(B) + (C)]/(A) (mass ratio) | | | 0.09 | 0.09 | 0.08 | 0.08 | 0.07 |
| (C)/(D) (mass ratio) | | | — | — | 5.13 | 3.41 | — |
| Weeding evaluation (score) | | | 8 | 7.8 | 8.4 | 8.8 | 6 |
| Formulation stability | Appearance evaluation (55° C., a day later) | | Separated | Separated | Homogeneous | Homogeneous | Separated |
| | Appearance evaluation (room temperature, a day later) | | Homogeneous | Homogeneous | Homogeneous | Homogeneous | Separated |
| | Appearance evaluation (0° C., a day later) | | Separated | Homogeneous | Homogeneous | Homogeneous | Separated |

In Tables 1 and 2, for mass % of formulating component (B), the numerals inside the parenthesis are mass % equivalent to component (B). In addition, while component (B) was included in formulating component (B'), the content thereof was a trace amount and therefore ignored.

Example 2 and Comparative Example 2

Using any of the formulation components mentioned in example 1 and comparative example 1, herbicidal efficacy enhancing agent compositions shown in Table 3 were prepared and evaluations of the following items were performed on them. The results are shown in Table 3. The herbicidal efficacy enhancing agent compositions of Tables 3 were prepared in the usual manner. That is, components (B) through (D) and (B') in formulation amounts in the tables were added to an appropriate amount of ion exchange water and dissolved therein at room temperature (25° C.). Note that mass % of formulation components in Table 3 are all numerical values based on the active components. In addition, for mass % of formulating component (B), the numerals inside the parenthesis are mass % equivalent to component (B). In addition, while component (B) was included in formulating component (B'), the content thereof was a trace amount and therefore ignored.

[Productivity Testing]

5.85 g of each herbicidal efficacy enhancing agent composition of Table 3, 4.15 g of a glyphosate isopropylamine salt as component (A) and a PTFE stirrer with a length of 10 mm were put into a transparent glass container (20 mL in capacity) and stirred with a vial hot stirrer (model number: HSH-10VA, manufactured by AS ONE Corporation) at a stirring rate of 200 rpm at room temperature (25° C.). It was visually checked that the contents became homogeneous and transparent, and a time required for the homogenization from the start of the stirring until they became homogeneous and transparent was measured. The results are shown in Table 3. Note that, in the aforementioned weeding testing, herbicide compositions obtained from the herbicidal efficacy enhancing agent compositions of examples 2-1 through 2-16 were given evaluations of 7.5 points or more and a herbicide composition obtained from the herbicidal efficacy enhancing agent composition of comparative example 2-1 was given an evaluation of 6.5 points.

TABLE 3

|  |  |  |  | Example 2 | | | | | | | | |
| --- | --- | --- | --- | --- | --- | --- | --- | --- | --- | --- | --- | --- |
|  |  |  |  | 2-1 | 2-2 | 2-3 | 2-4 | 2-5 | 2-6 | 2-7 | 2-8 | 2-9 |
| Herbicidal efficacy enhancing agent composition | Formulation composition (mass %) | (B) | Polyoxyethylene (5) coco amine | 2.05 (1.71) | | | 2.05 (1.71) | 2.05 (1.71) | 2.05 (1.71) | 1.81 (1.56) | | |
| | | | Dimethyl lauryl amine | | 2.05 (2.05) | | | | | | 1.81 (1.81) | |
| | | | Polyoxyethylene (15) lauryl amine | | | 2.05 (2.05) | | | | | | 1.81 (1.81) |
| | | (B') | Polyoxyethylene (15) tallow amine | | | | | | | | | |
| | | (C) | ($C_A$) Polyoxyethylene (12) lauryl ether | 4.79 | 4.79 | 4.79 | | | | 4.21 | 4.21 | 4.21 |

TABLE 3-continued

| | | | | 2-1 | 2-2 | 2-3 | 2-4 | 2-5 | 2-6 | 2-7 | 2-8 | 2-9 |
|---|---|---|---|---|---|---|---|---|---|---|---|---|
| | | ($C_B$) | POE (3) POP (1.5) POE (3) C12-14 ether | | | | | | | 4.79 | | |
| | | ($C_A$) | Polyoxyethylene (9) lauryl ether | | | | | | | | 4.79 | |
| | | ($C_A$) | Polyoxyethylene (7) decyl ether | | | | | | | | | 4.79 |
| | (D) | | Coco alkyltrimethylammonium chloride | | | | | | | 0.82 | 0.82 | 0.82 |
| | | | Coco alkyldimethylbenzyl ammonium chloride | | | | | | | | | |
| Water | | | | Balance | Balance | Balance | Balance | Balance | Balance | Balance | Balance | Balance |
| | Total | | | 100 | 100 | 100 | 100 | 100 | 100 | 100 | 100 | 100 |
| | (B)/(C) (mass ratio) | | | 0.36 | 0.43 | 0.43 | 0.36 | 0.36 | 0.36 | 0.37 | 0.43 | 0.43 |
| | (B) + (C) (mass %) | | | 6.5 | 6.84 | 6.84 | 6.5 | 6.5 | 6.5 | 5.77 | 6.02 | 6.02 |
| | ($C_A$)/($C_B$) (mass ratio) | | | — | — | — | — | — | — | — | — | — |
| | (C)/(D) (mass ratio) | | | — | — | — | — | — | — | 5.13 | 5.13 | 5.13 |
| Productivity evaluation | time required for homogenization (second) | | | 17 | 13 | 20 | 13 | 15 | 12 | 8 | 5 | 14 |

| | | | | Example 2 | | | | | | | Comparative example 2 |
|---|---|---|---|---|---|---|---|---|---|---|---|
| | | | | 2-10 | 2-11 | 2-12 | 2-13 | 2-14 | 2-15 | 2-16 | 2-1 |
| Herbicidal efficacy enhancing agent composition | Formulation composition (mass %) | (B) | Polyoxyethylene (5) coco amine | 1.81 (1.56) | 1.81 (1.56) | 1.81 (1.56) | 1.81 (1.56) | 1.71 (1.47) | 1.81 (1.56) | 1.71 (1.47) | |
| | | | Dimethyl lauryl amine | | | | | | | | |
| | | | Polyoxyethylene (15) lauryl amine | | | | | | | | |
| | | (B') | Polyoxyethylene (15) tallow amine | | | | | | | | 2.05 |
| | | (C) | ($C_A$) Polyoxyethylene (12) lauryl ether | | | | 2.53 | 2.38 | 2.53 | 2.38 | 4.79 |
| | | | ($C_B$) POE (3) POP (1.5) POE (3) C12-14 ether | 4.21 | | | 1.68 | 1.59 | 1.68 | 1.59 | |
| | | | ($C_A$) Polyoxyethylene (9) lauryl ether | | 4.21 | | | | | | |
| | | | ($C_A$) Polyoxyethylene (7) decyl ether | | | 4.21 | | | | | |
| | | (D) | Coco alkyltrimethylammonium chloride | 0.82 | 0.82 | 0.82 | | | 0.82 | | |
| | | | Coco alkyldimethylbenzyl ammonium chloride | | | | | | | 1.16 | |
| Water | | | | Balance | Balance | Balance | Balance | Balance | Balance | Balance | Balance |
| | Total | | | 100 | 100 | 100 | 100 | 100 | 100 | 100 | 100 |
| | (B)/(C) (mass ratio) | | | 0.37 | 0.37 | 0.37 | 0.37 | 0.37 | 0.37 | 0.37 | — |
| | (B) + (C) (mass %) | | | 5.77 | 5.77 | 5.77 | 5.77 | 5.44 | 5.77 | 5.44 | 4.79 |
| | ($C_A$)/($C_B$) (mass ratio) | | | — | — | — | 1.51 | 1.50 | 1.51 | 1.50 | — |
| | (C)/(D) (mass ratio) | | | 5.13 | 5.13 | 5.13 | — | — | 5.13 | 3.42 | — |
| Productivity evaluation | time required for homogenization (second) | | | 5 | 8 | 5 | 13 | 11 | 7 | 8 | 21 |

The invention claimed is:

1. An herbicide composition, comprising components (A) to (D):

component (A): at least one selected from the group consisting of glyphosate and a salt thereof;

component (B): at least one selected from the group consisting of a compound according to formula (b1) and an acid salt thereof:

(b1)

wherein $R^{1b}$ is a hydrocarbon group having 8 to 14 carbons, $A^{1b}O$ is an alkyleneoxy group having 2 to 4 carbons, each of m and n is independently an average number of added moles of $A^{1b}O$, each of m and in is independently 0 or more, a sum of m and n is 0 to 20, and each of $R^{2b}$ and $R^{3b}$ is independently a hydrogen atom or a methyl group;

component (C): at least one selected from the group consisting of a compound according to formula (c2) and a compound according to formula (c3):

$$R^{2c}-O-(EO)_r-H \qquad (c2)$$

wherein $R^{2c}$ is an alkyl group or an alkenyl group having 10 to 18 carbons, EO is an ethyleneoxy group, r is an average number of added moles of EO, and r is 2 to 50; and $$R^{3c}-O-[(EO)_p/(PO)_q]-H \quad (c3)$$

wherein $R^{3c}$ is an alkyl group or an alkenyl group having 10 to 18 carbons, EO is an ethyleneoxy group, PO is a propyleneoxy group, p and q are average numbers of added moles of EO and PO, respectively, p is 4 to 10, q is 0 to 10, a sum of p and q is 6 to 20, and "/" indicates that EO and PO may be arranged as blocks or randomly; and component (D): a compound according to formula (d1):

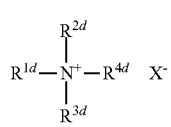

(d1)

wherein $R^{1d}$ is an alkyl group having 8 to 18 carbons, each of $R^{2d}$ and $R^{3d}$ is independently a methyl group or an ethyl group, $R^{4d}$ is a methyl group, an ethyl group, or a benzyl group, and $X^-$ is an anion;

wherein:
a mass ratio of component (B) to component (C) in the composition, (B)/(C), is 0.25 to 0.6;
a total amount of component (B) and component (C) in the composition is 2.0 to 20 mass %; and
a mass ratio of component (C) to component (D) in the composition, (C)/(D), is 1 to 10.

2. The herbicide composition according to claim 1, wherein the sum of m and n is 5 to 15.

3. The herbicide composition according to claim 1, wherein a mass ratio of a total amount of components (B) and (C) to an amount of component (A) in the composition, [(B)+(C)]/(A), is 0.04 to 1.4.

4. The herbicide composition according to claim 1, further comprising water.

5. The herbicide composition according to claim 1, wherein component (C) comprises the compound according to formula (c2) and the compound according to formula (c3).

6. A weeding method comprising spraying an herbicidal spray liquid prepared from the herbicide composition according to claim 1 on to a plant.

7. An herbicidal efficacy enhancing agent composition, comprising components (B) to (D):

component (B): at least one selected from the group consisting of a compound according to formula (b1) and an acid salt thereof:

(b1)

wherein $R^{1b}$ is a hydrocarbon group having 8 to 14 carbons, $A^{1b}O$ is an alkyleneoxy group having 2 to 4 carbons, each of m and n is independently an average number of added moles of $A^{1b}O$, each of m and in is independently 0 or more, a sum of m and n is 0 to 20, and each of $R^{2b}$ and $R^{3b}$ is independently a hydrogen atom or a methyl group;

component (C): at least one selected from the group consisting of a compound according to formula (c2) and a compound according to formula (c3):

$$R^{2c}-O-(EO)_r-H \quad (c2)$$

wherein $R^{2c}$ is an alkyl group or an alkenyl group having 10 to 18 carbons, EO is an ethyleneoxy group, r is an average number of added moles of EO, and r is 2 to 50; and $$R^{3c}-O-[(EO)_p/(PO)_q]-H \quad (c3)$$

wherein $R^{3c}$ is an alkyl group or an alkenyl group having 10 to 18 carbons, EO is an ethyleneoxy group, PO is a propyleneoxy group, p and q are average numbers of added moles of EO and PO, respectively, p is 4 to 10, q is 0 to 10, a sum of p and q is 6 to 20, and "/" indicates that EO and PO may be arranged as blocks or randomly; and component (D): a compound according to formula (d1):

(d1)

wherein $R^{1d}$ is an alkyl group having 8 to 18 carbons, each of $R^{2d}$ and $R^{3d}$ is independently a methyl group or an ethyl group, $R^{4d}$ is a methyl group, an ethyl group, or a benzyl group, and $X^-$ is an anion;

wherein:
a mass ratio of component (B) to component (C) in the composition, (B)/(C), is 0.25 to 0.6;
a total amount of component (B) and component (C) in the composition is 2.0 to 20 mass %; and
a mass ratio of component (C) to component (D) in the composition, (C)/(D), is 1 to 10.

8. The herbicidal efficacy enhancing agent composition according to claim 7, wherein the sum of m and n is 5 to 15.

9. The herbicidal efficacy enhancing agent composition according to claim 7, further comprising water.

10. The herbicidal efficacy enhancing agent composition according to claim 7, wherein component (C) comprises the compound according to formula (c2) and the compound according to formula (c3).

11. A method for formulating an herbicide composition, comprising combining the herbicidal efficacy enhancing agent composition according to claim 7 with a component (A), wherein:

component (A) is at least one selected from the group consisting of glyphosate and a salt thereof; and
a mass ratio of a total amount of components (B) and (C) to an amount of component (A) in the herbicide composition, [(B)+(C)]/(A), is 0.04 to 1.4.

\* \* \* \* \*